(12) United States Patent
Yasukawa et al.

(10) Patent No.: US 11,071,163 B2
(45) Date of Patent: Jul. 20, 2021

(54) USER APPARATUS, AND RESOURCE CONTROL METHOD

(71) Applicant: NTT DOCOMO, INC., Tokyo (JP)

(72) Inventors: Shimpei Yasukawa, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/501,195

(22) PCT Filed: Aug. 5, 2015

(86) PCT No.: PCT/JP2015/072274
§ 371 (c)(1),
(2) Date: Feb. 2, 2017

(87) PCT Pub. No.: WO2016/021656
PCT Pub. Date: Feb. 11, 2016

(65) Prior Publication Data
US 2017/0223699 A1    Aug. 3, 2017

(30) Foreign Application Priority Data

Aug. 7, 2014  (JP) .............................. JP2014-161903

(51) Int. Cl.
*H04W 72/04* (2009.01)
*H04W 76/30* (2018.01)
(Continued)

(52) U.S. Cl.
CPC ....... *H04W 76/30* (2018.02); *H04W 72/0433* (2013.01); *H04W 72/0453* (2013.01); *H04W 76/14* (2018.02); *H04W 92/18* (2013.01)

(58) Field of Classification Search
CPC ......... H04W 72/0433; H04W 72/0446; H04W 72/0426; H04W 72/0453; H04W 76/30;
(Continued)

(56) References Cited

U.S. PATENT DOCUMENTS

2009/0116434 A1    5/2009  Lohr et al.
2013/0310057 A1*  11/2013  Tabet ................... H04W 76/045
                                                              455/450

(Continued)

FOREIGN PATENT DOCUMENTS

CN        103686691 A       3/2014
EP           2683183 A1     1/2014
(Continued)

OTHER PUBLICATIONS

International Search Report issued in corresponding application No. PCT/JP2015/072274 dated Oct. 27, 2015 (4 pages).

(Continued)

*Primary Examiner* — Hassan Kizou
*Assistant Examiner* — Mahbubul Bar Chowdhury
(74) *Attorney, Agent, or Firm* — Osha Bergman Watanabe & Burton LLP

(57) ABSTRACT

A user apparatus for use in a mobile communication system that supports Device-to-Device (D2D) communication, including a receiver that receives a resource for D2D communication assigned from a base station in the mobile communication system; a transmitter that transmits a D2D signal to another user apparatus by using the resource for D2D communication assigned from the base station; and a processor that generates a resource release request signal for requesting release of the resource for D2D communication assigned from the base station, wherein the transmitter transmits, to the base station, the resource release request signal for requesting release of the resource for D2D com- (Continued)

```
(1) RESOURCE REQUEST (RESOURCE 1)
(2) RESOURCE 1 ASSIGNMENT
(3) RESOURCE REQUEST (RESOURCE 1)
(4) RESOURCE 1 RELEASE
``` munication assigned from the base station, and wherein the transmitter transmits a resource request signal to the base station as the resource release request signal for requesting release of the resource.

3 Claims, 16 Drawing Sheets

(51) Int. Cl.
*H04W 92/18* (2009.01)
*H04W 76/14* (2018.01)

(58) Field of Classification Search
CPC ... H04W 76/14; H04W 76/023; H04W 76/06; H04W 76/38; H04W 92/18
See application file for complete search history.

(56) References Cited

U.S. PATENT DOCUMENTS

| | | | | |
|---|---|---|---|---|
| 2013/0322413 | A1* | 12/2013 | Pelletier | H04W 72/1289 370/336 |
| 2014/0328329 | A1* | 11/2014 | Novlan | H04W 56/002 370/336 |
| 2015/0208384 | A1* | 7/2015 | Baghel | H04W 8/005 455/450 |
| 2015/0222401 | A1* | 8/2015 | Xu | H04W 76/14 370/329 |
| 2015/0237555 | A1* | 8/2015 | Kashiwase | H04W 36/14 370/329 |
| 2015/0271846 | A1* | 9/2015 | Kowalski | H04W 72/14 370/329 |
| 2016/0278121 | A1* | 9/2016 | Agiwal | H04W 74/002 |
| 2016/0381663 | A1* | 12/2016 | Zhao | H04W 8/005 370/329 |
| 2017/0171837 | A1* | 6/2017 | Chen | H04W 72/04 |

FOREIGN PATENT DOCUMENTS

| | | |
|---|---|---|
| JP | 2009-525644 A | 7/2009 |
| JP | 2012-213206 A | 11/2012 |
| WO | 2014/014323 A1 | 1/2014 |
| WO | 2015/059834 A1 | 4/2015 |

OTHER PUBLICATIONS

Written Opinion of the International Searching Authority issued in corresponding application No. PCT/JP2015/072274 dated Oct. 27, 2015 (5 pages).
ZTE, "Transmission resource configuration for D2D discovery"; 3GPP TSG-RAN WG2 Meeting #86, R2-142152; Seoul, South Korea; May 19-23, 2014 (5 pages).
ZTE, "D2D communication resource mode configuration"; 3GPP TSG-RAN WG2 Meeting #86, R2-142146; Seoul, South Korea; May 19-23, 2014 (5 pages).
Huawei, "RAN3 considerations for Proximity Discovery"; 3GPP TSG RAN WG3 Meeting #83, R3-140266; Prague, Czech Republic; Feb. 10-14, 2014 (6 pages).
Intel Corporation, "Resource allocation signaling for D2D discovery"; 3GPP TSG-RAN WG2 #86, R2-142050; Seoul, Korea; May 19-23, 2014 (3 pages).
3GPP TR 36.843 V12.0.1, "3rd Generation Partnership Project; Technical Specification Group Radio Access Network; Study on LTE Device to Device Proximity Services; Radio Aspects (Release 12)"; Mar. 2014 (50 pages).
Office Action issued in corresponding Japanese application No. 2014-161903 dated Oct. 27, 2015 (7 pages).
Extended European Search Report issued in corresponding European Patent Application No. 15830360.2, dated Jul. 2, 2017 (7 pages).
Office Action issued in the counterpart Chinese Patent Application No. 201580040822.5, dated Aug. 22, 2019 (19 Pages).
Office Action issued in the counterpart Chinese Patent Application No. 201580040822.5, dated Mar. 24, 2020 (27 pages).
Office Action issued in European Application No. 15830360.2; dated Jan. 27, 2021 (4 pages).

* cited by examiner

FIG.6A (1) RESOURCE ASSIGNMENT REQUEST
   (RESOURCE 1)
(2) RESOURCE 1 ASSIGNMENT
(3) RESOURCE RELEASE REQUEST
   (RESOURCE 1)
(4) RESOURCE 1 RELEASE

FIG.6B (1) RESOURCE REQUEST (RESOURCE 1)
(2) RESOURCE 1 ASSIGNMENT
(3) RESOURCE REQUEST (RESOURCE 1)
(4) RESOURCE 1 RELEASE

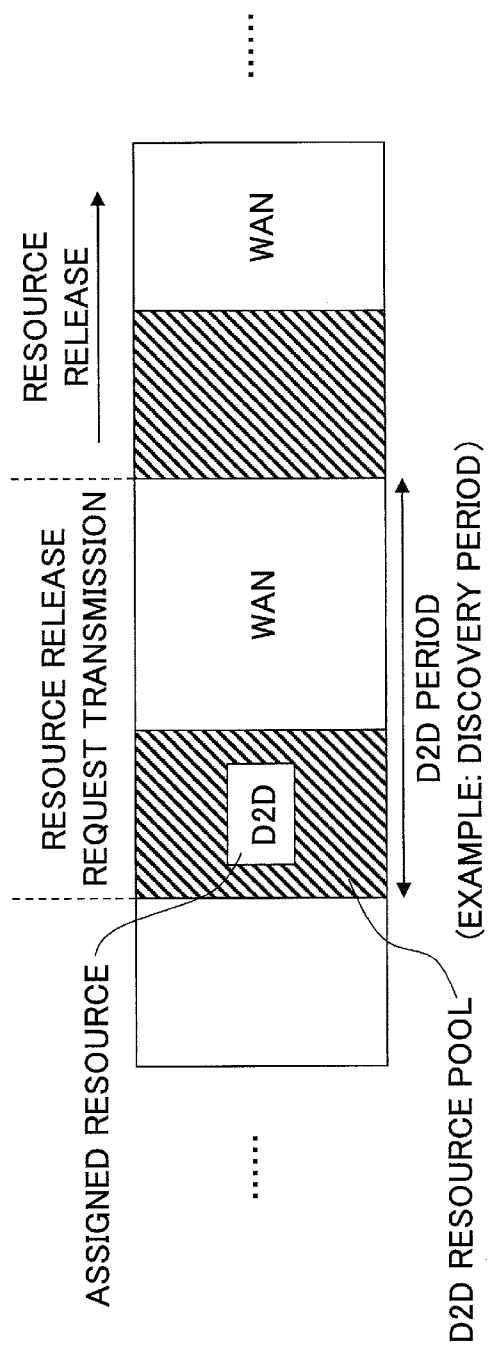

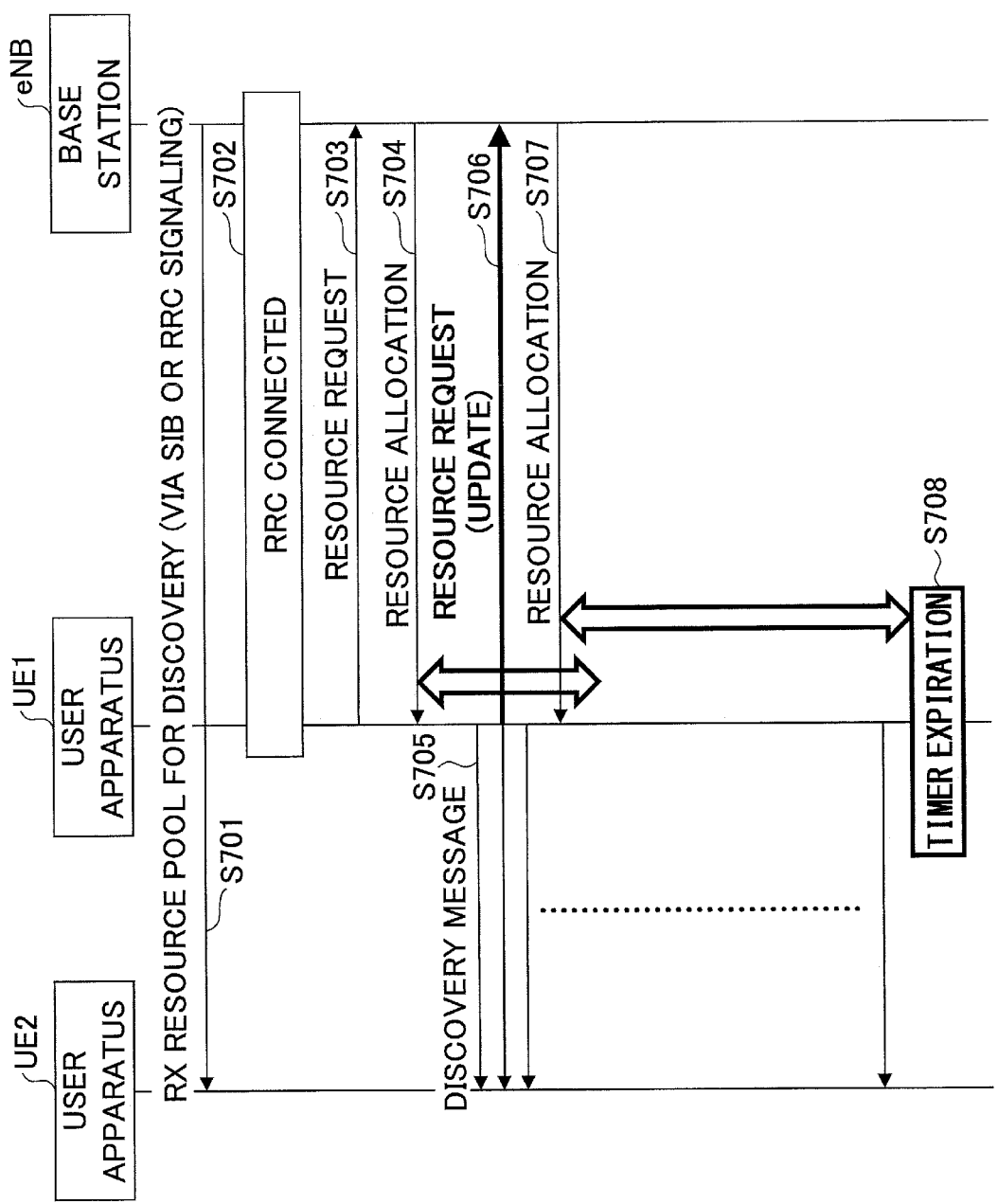

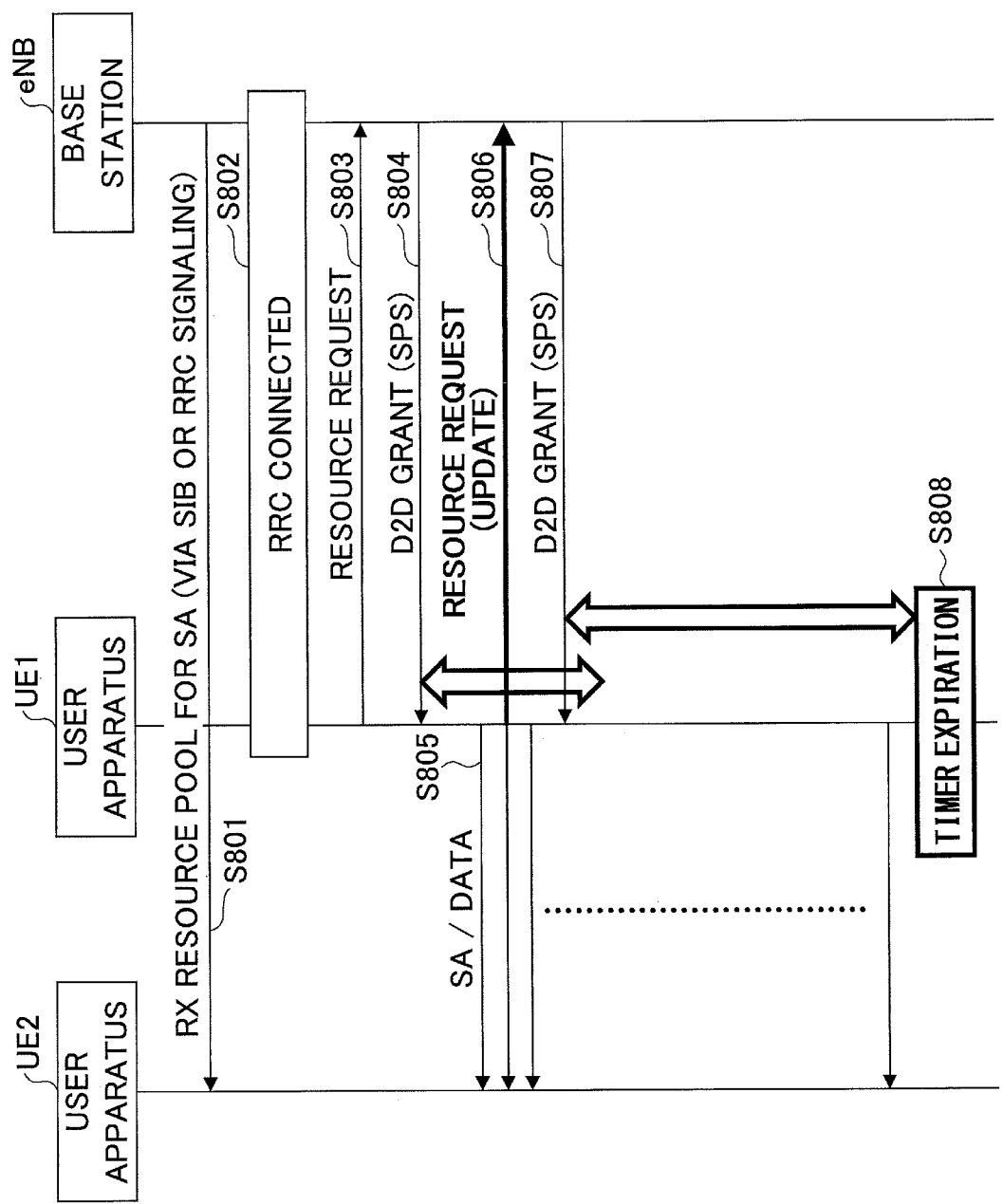

FIG.14A (1) RESOURCE REQUEST (RESOURCE 1,
    NEW (OR ADDITIONAL) ASSIGNMENT)
(2) RESOURCE 1 NEW (ADDITIONAL) ASSIGNMENT
    (TIMER START)

FIG.14B (1) RESOURCE REQUEST (RESOURCE 1, UPDATE)
(2) RESOURCE 1 IS KEPT ASSIGNED
    (TIMER RESET, RE-START)

FIG.14C (1) RESOURCE REQUEST (RESOURCE 2, NEW ASSIGNMENT)
(2) RESOURCE 1 RELEASE, RESOURCE 2 ASSIGNMENT
    (TIMER RESET, RE-START)

USER APPARATUS, AND RESOURCE CONTROL METHOD

TECHNICAL FIELD

The present invention relates to D2D communication (user apparatus-to-user apparatus communication). More particularly, the present invention relates to a technique of assignment and release of a radio resource (to be referred to as resource hereinafter) necessary for a user apparatus UE to perform D2D communication.

BACKGROUND ART

In current mobile communication systems such as LTE, it is common that a user apparatus UE and a base station eNB perform communication so that communication is performed between user apparatuses UE via the base station eNB and the like. However, in recent years, various techniques on D2D communication are being considered for performing direct communication between user apparatuses UE.

Especially, in D2D communication in LTE, there are proposed "Communication" for performing data communication such as push telephone call between user apparatuses UE, and "Discovery" in which a user apparatus UE transmits a discovery signal including an ID and the like of the user apparatus UE itself so as to cause a user apparatus UE of a reception side to detect the user apparatus UE of the transmission side (refer to non-patent document 1). By the way, it is assumed that Communication is applied to Public safety (police, fire radio), for example.

In D2D communication defined in LTE, it is proposed that each user apparatus UE uses a part of uplink resources already defined as resources for uplink signal transmission from the user apparatus UE to a base station eNB. Also, in assignment of a resource for use in D2D communication, it is also proposed that assist from the base station eNB is performed. In the following, outline of resource assignment for transmission of D2D communication of LTE that is currently proposed is described (refer to non-patent document 1).

As to "Communication", there are Mode1 and Mode2. In Mode1, a resource is dynamically assigned by a (E)PDCCH transmitted from the base station eNB to the user apparatus UE. Also, in assignment of the (E)PDCCH, semistatic resource assignment (SPS: Semi-persistent scheduling) is also proposed. In Mode2, the user apparatus UE autonomously selects a transmission resource by a resource pool notified by an upper layer signaling (for example, SIB, RRC signal) transmitted from the base station eNB to the user apparatus UE.

As to "Discovery", there are Type1, Type2a, and Type2b. In Type1, the user apparatus UE autonomously selects a transmission resource by a resource pool notified by an upper layer signaling. In Type2a, a resource is dynamically assigned by a (E)PDCCH. In Type2b, semistatic resource is assigned by an upper layer signaling (for example, RRC signal). By the way, the "semistatic resource" is, for example, a resource assigned in a fixed manner for a predetermined period, so that the user apparatus UE performs communication of D2D using the resource that is semistatically assigned.

The semistatically assigned resource is effective until the base station eNB instructs resource release (de-activates) to the user apparatus UE, or until the user apparatus UE transits to an Idle state.

RELATED ART DOCUMENT

Non-Patent Document

[NON-PATENT DOCUMENT 1] 3GPP TR 36.843 V12.0.1 (2014 March)

SUMMARY OF THE INVENTION

Problem to be Solved by the Invention

In Discovery of D2D communication, there is a case where the user apparatus UE transmits a Discovery message which is different for each application. Also, transmission frequency and duration time may be different for each application.

On the other hand, as described before, in Type2b in resource assignment methods of Discovery, a resource once assigned to the user apparatus UE is not released unless the base station eNB instructs release of the resource or the user apparatus UE transits to an Idle state. As to resource release by an instruction from the base station eNB, since the base station eNB cannot ascertain D2D transmission state of the user apparatus UE, it is difficult to determine whether to perform resource release. Also, as to resource release due to transition to the Idle state of the user apparatus UE, transition to the Idle state is based on a timer (example: UE inactivity timer), so that the user apparatus UE does not transit to the Idle state as long as cellular communication continues at certain intervals.

In view of the above-mentioned points, in the semistatic resource assignment of Discovery, there is a possibility in that a state in which the user apparatus UE is assigned more than necessary resources continues. FIG. 1 is a sequence diagram for explaining this problem. In FIG. 1, user apparatuses UE1 and UE2 exist under the base station eNB, and Discovery message transmission is performed from the user apparatus UE1 to the user apparatus UE2. This point also applies to other sequence diagrams on Discovery.

As shown in FIG. 1, in step 11, a resource pool for reception is assigned to the user apparatus UE2 of the reception side. In step 12, the user apparatus UE1 and the base station eNB are RRC connected. Next, the user apparatus UE1 transmits a resource request to the base station eNB (step 13), and receives resource allocation from the base station eNB (step 14). The resource request may be an individual signaling signal or may be performed in D2D authentication.

The user apparatus UE1 that receives the resource allocation transmits a Discovery message (step 15). As described before, unless there is an explicit instruction from the base station eNB, the resource continues to be assigned until the user apparatus UE1 transits to the Idler state (step 16). The example of FIG. 1 shows that an unnecessary resource continues to be assigned when discovery message transmission is not performed.

FIG. 2 is also a diagram for explaining a problem. In FIG. 2, steps 21~25 are the same as steps 11~15 of FIG. 1. In order to avoid unnecessary assignment shown in FIG. 1, it can be considered to periodically transmit De-activation shown in step 26 of FIG. 2 from the base station eNB to the user apparatus UE1 so as to perform resource release/reassignment. However, according to this method, signaling for reassignment increases, and time during which a resource of Type2b cannot be used occurs (period indicated by Type 2b D2D discovery unavailable of FIG. 2).

As described before, also in D2D "Communication" there is a case where semistatic resource assignment is performed in Mode1. Like the case of Discovery, in general, since it is difficult that the base station eNB ascertains D2D transmission state of the user apparatus UE, it is difficult to determine whether resource release can be performed or not. As to SPS in uplink of cellular communication, resource release by continuous zero MAC SDU (implicitReleaseAfter) can be utilized. However, in general, since it is difficult for the base station eNB to receive a D2D signal, the problem of unnecessary resource holding occurs also for Communication like the case of Discovery.

The present invention is contrived in view of the above-mentioned points, and an object of the present invention is provide a technique to enable to avoid that a resource for D2D communication assigned to a user apparatus is held even when it is unnecessary in a mobile communication system supporting D2D communication.

Means for Solving the Problem

According to an embodiment of the present invention, there is provided a user apparatus for use in a mobile communication system that supports D2D communication, including:

D2D communication means that transmits a D2D signal to another user apparatus by using a resource for D2D communication assigned from a base station in the mobile communication system; and resource control means that transmits, to the base station, a resource release request signal for requesting release of a resource for D2D communication assigned from the base station.

Also, according to an embodiment of the present invention, there is provided a user apparatus for use in a mobile communication system that supports D2D communication, including:

D2D communication means that transmits a D2D signal to another user apparatus by using a resource for D2D communication assigned from a base station in the mobile communication system; and resource control means that releases the resource when a predetermines period elapses or a number of times of transmission of the D2D signal reaches a predetermined number of times after the resource is assigned.

Also, according to an embodiment of the present invention, there is provided a resource control method performed by a base station and a user apparatus for use in a mobile communication system that supports D2D communication, including:

a step in which the base station assigns a resource for D2D communication to the user apparatus, and transmits a resource assignment signal including information of the resource for D2D communication to the user apparatus to assign the resource for D2D communication to the user apparatus;

a step in which the user apparatus transmits a D2D signal to another user apparatus by using the resource assigned by the base station; and a step in which the user apparatus transmits, to the base station, a resource release request signal for requesting release of the resource assigned by the base station to release the resource.

Also, according to an embodiment of the present invention, there is provided a resource control method performed by a base station and a user apparatus for use in a mobile communication system that supports D2D communication, including:

a step in which the base station assigns a resource for D2D communication to the user apparatus, and transmits a resource assignment signal including information of the resource for D2D communication to the user apparatus to assign the resource for D2D communication to the user apparatus;

a step in which the user apparatus transmits a D2D signal to another user apparatus by using the resource assigned by the base station; and a step in which the user apparatus releases the resource when a predetermines period elapses or a number of times of transmission of the D2D signal reaches a predetermined number of times after the resource is assigned.

Effect of the Present Invention

According to an embodiment of the present invention, there is provided a technique to enable to avoid that a resource for D2D communication assigned to a user apparatus is held even when it is unnecessary in a mobile communication system supporting D2D communication.

BRIEF DESCRIPTION OF THE DRAWINGS

FIG. 6A is a diagram for explaining an example of resource release request;

FIG. 6B is a diagram for explaining an example of resource release request;

FIG. 7 is a diagram showing an example of timing of resource release;

FIG. 12 is a sequence diagram for explaining process content of a modified example in the second embodiment (in the case of Discovery);

FIG. 13 is a sequence diagram for explaining process content of a modified example in the second embodiment (in the case of Communication);

FIG. 14A is a diagram for explaining an example of resource request;

FIG. 14B is a diagram for explaining an example of resource request;

FIG. 14C is a diagram for explaining an example of resource request;

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below. For example, although it is assumed that the mobile communication system of the present embodiments is a system of a scheme complying with LTE, the present invention is not limited to LTE, and the present invention can be applied to other communication schemes. In the specification and the claims, the term "LTE" is used to mean widely including not only a communication scheme corresponding to 3GPP release 8 or 9, but also a communication scheme corresponding to 3GPP release 10, 11, or 12 or later release.

System Configuration

Figure 1:
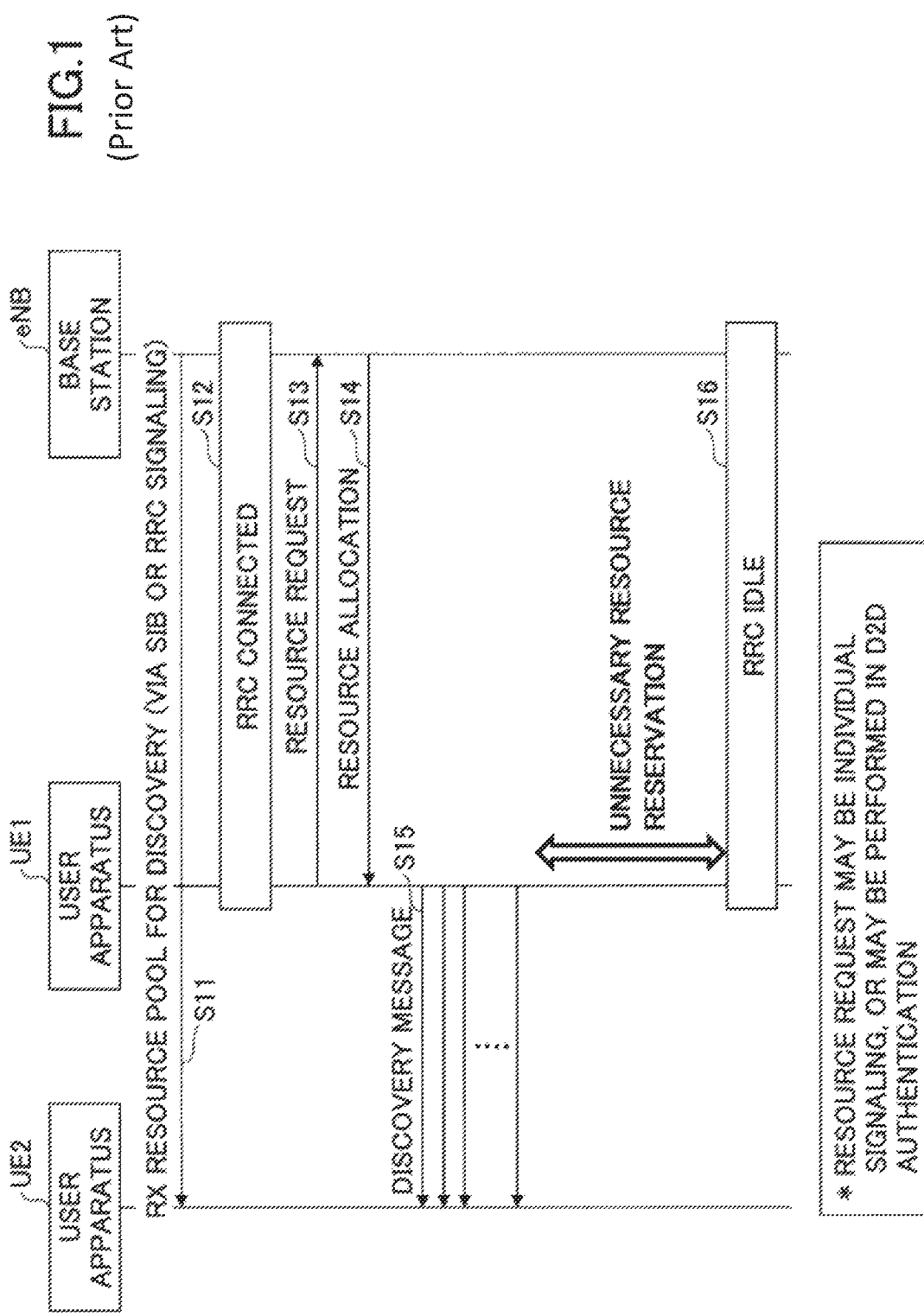
FIG. 1 is a diagram for explaining a problem in D2D communication.
Figure 2:
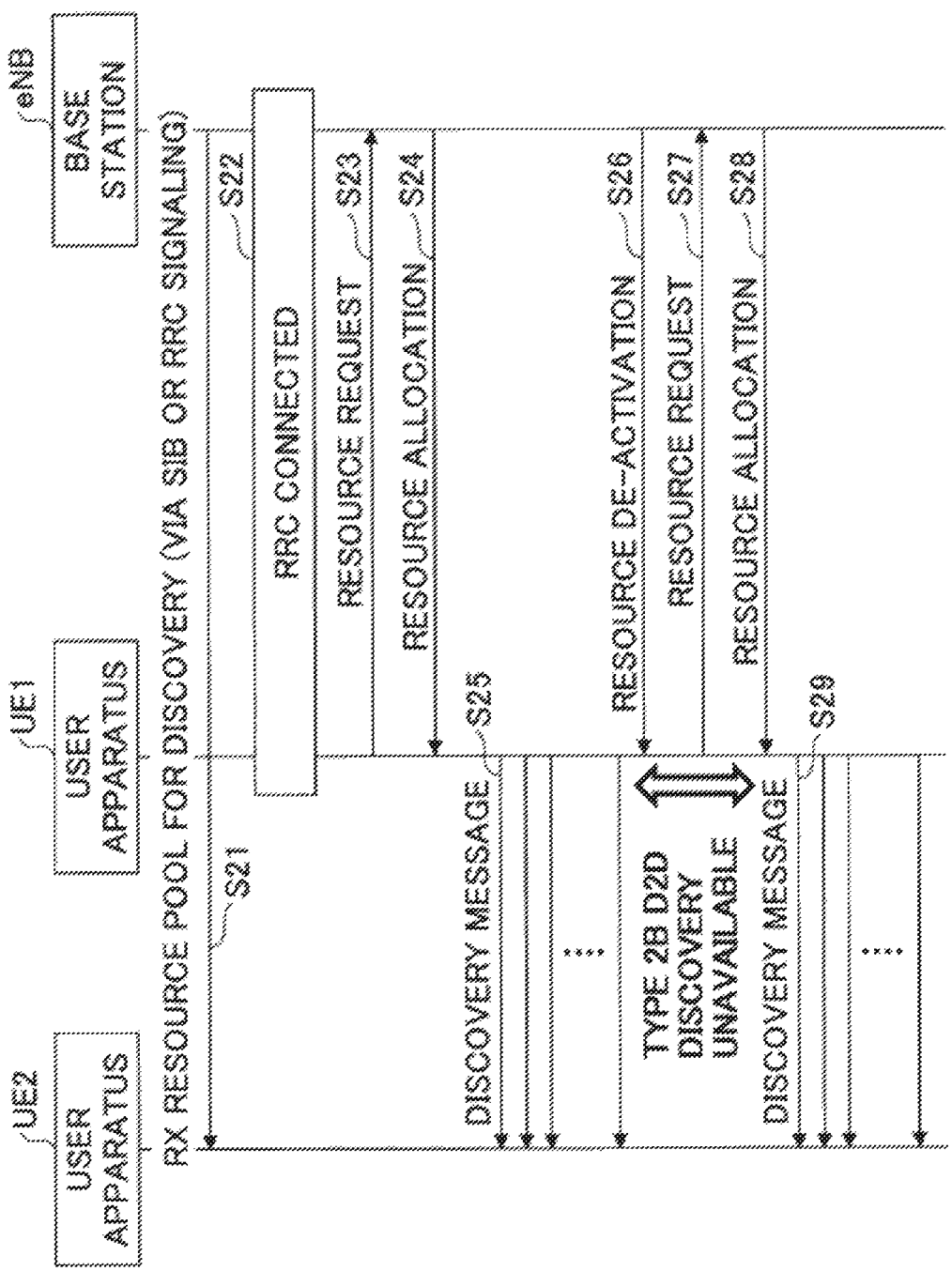
FIG. 2 is a diagram for explaining a problem in D2D communication.
Figure 3:
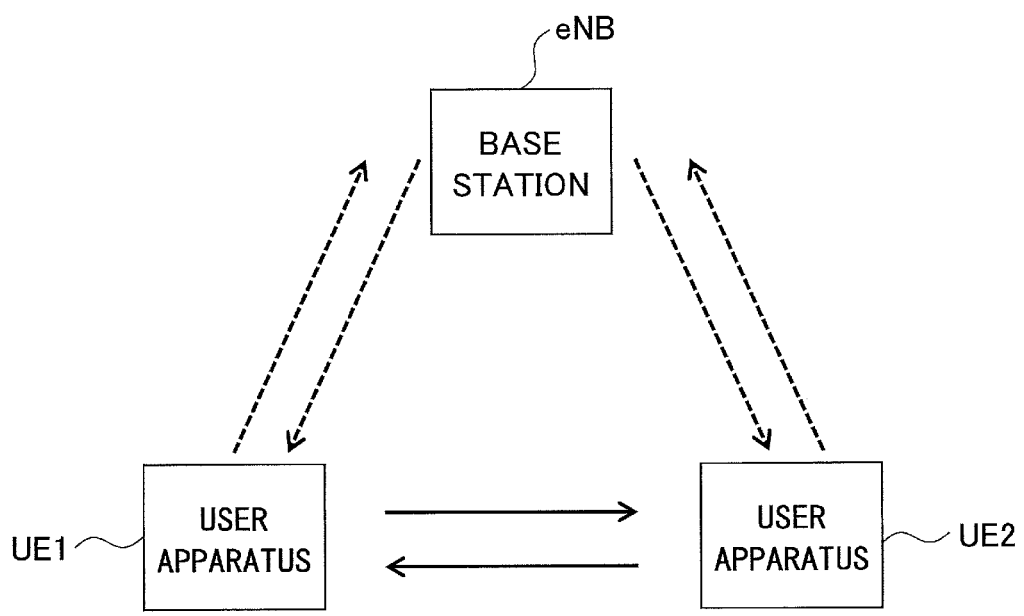
FIG. 3 is a block diagram of a system in an embodiment of the present invention.

FIG. 3 shows a configuration example of a mobile communication system in an embodiment (common to first and second embodiments) of the present invention. As shown in FIG. 3, the communication system of the present embodiment is a cellular communication system in which there are user apparatuses UE1 and UE2 under a base station eNB. The user apparatuses UE1 and UE2 have a D2D communication function respectively, so that it is possible to perform D2D communication between user apparatuses UE1 and UE2. Also, each of the user apparatuses UE1 and UE2 can perform normal cellular communication with the base station eNB, and can receive resource assignment for D2D communication from the base station eNB. In the following, there is a case where the user apparatuses UE1 and UE2 are collectively described as a user apparatus UE.

In the following, as an example of a method for solving the before-mentioned problem in which there is a possibility in that a semistatic resource continues to be held in the user apparatus UE that performs D2D communication, an example for using a signal such as a resource release request from the user apparatus UE to the base station eNB is described as a first embodiment, and an example for setting a valid term for an assigned resource is described as a second embodiment.

First Embodiment

First, the first embodiment is described. As described above, in the first embodiment, an explicit resource release request is performed from the user apparatus UE to the base station eNB. Aside from the after-mentioned modified example, the resource release request is transmitted from the user apparatus UE to the base station eNB using an uplink signal of LTE. Although the type of the uplink signal for the resource release request is not limited to a specific one, for example, an upper layer signaling such as an RRC signal and a MAC signal and the like can be used. Also, the resource release request may be transmitted by a PUCCH (Physical uplink control channel). Further, the resource release request may be transmitted as control data by a PUSCH (Physical uplink shared channel).

A sequence example of processes of the first embodiment in the case of D2D Discovery is described with reference to FIG. 4.

A resource pool for Discovery reception (resource pool for discovery) is assigned to the user apparatus UE2 of the reception side (step 101). The user apparatus UE1 is RRC connected to the base station eNB (step 102).

For example, the user apparatus UE1 transmits a resource request to the base station eNB based on an instruction by a D2D application provided in the user apparatus UE1 (step 103), and receives a semistatic Type2B resource allocation from the base station eNB (step 104). As described before, the resource request may be an individual signaling or may be performed in D2D authentication. The resource pool for the Discovery reception may be performed in or after D2D authentication.

The user apparatus UE1 that receives the resource assignment performs Discovery message transmission using an assigned resource (step 105).

In the present embodiment, in step 106, the user apparatus UE1 transmits a resource release request (resource release) to the base station eNB (step 106). For example, this resource release request includes at least identification information of the user apparatus UE1. The base station eNB that receives the resource release request (resource release) releases a resource assigned for Discovery to the user apparatus UE1. Accordingly, it becomes possible that the base station eNB assigns the resource to another user apparatus UE.

After that, the base station eNB can transmit a resource de-activation to the user apparatus UE1 for instructing the user apparatus UE1 to release a resource related to the resource release request (or for notifying that the base station eNB has released the resource) (step 107). The user apparatus UE1 that receives the resource deactivation releases the resource that is assigned.

By the way, to execute step 107 (resource deactivation) is not essential, and it may not be performed. In such a case, for example, the user apparatus UE1 may release the resource being triggered by transmission of the resource release request, or may release the resource being triggered by a reception of an ACK signal and the like of low layer for the resource release request.

As a trigger based on which the user apparatus UE1 transmits a resource release request, there are, for example, elapse of a predetermined time after the last Discovery message is transmitted, elapse of a predetermined time after a resource is assigned in step 104, an instruction from an upper layer of the user apparatus UE1, and the like. However, it is not limited to these.

Next, a sequence example of processes of the first embodiment in the case of D2D Communication is described with reference to FIG. 5.

A resource pool for SA (Scheduling Assignment) reception (resource pool for SA) is assigned to the user apparatus UE2 of the reception side (step 201). By the way, in the present embodiment, since it is assumed to receive data by a data resource signaled by SA, a resource pool for data reception may not be assigned from the base station eNB, or a resource pool for data reception may be assigned for enhancing degree of freedom for resource assignment of SA and data.

The user apparatus UE1 is RRC connected to the base station eNB (step 202). For example, the user apparatus UE transmits a resource request to the base station eNB based on an instruction by a D2D application provided in the user apparatus UE1 (step 203), and receives a semistatic resource assignment signal (D2D grant (SPS)) from the base station eNB (step 204). The SPS here indicates semistatic resource assignment, and it may be a form different from semistatic resource assignment for PDSCH and PUSCH. The resource request may be an individual signaling or may be performed in D2D authentication. The resource pool for SA and data reception may be also performed in or after D2D authentication.

The user apparatus UE1 transmits an SA or data using an assigned resource, so that the user apparatus UE2 receives them (step 205). By the way, the SA is scheduling information indicating a resource position of D2D data. The user apparatus UE1 transmits data using a resource indicated by the SA, and the user apparatus UE2 receives (modulates, decodes) the data.

After that, the user apparatus UE1 transmits a resource release request (resource release) to the base station eNB (step 206). For example, this resource release request includes at least identification information of the user apparatus UE1. The base station eNB that receives the resource release request (resource release) releases a resource assigned for Communication to the user apparatus UE1. Accordingly, it becomes possible that the base station eNB assigns the resource to another user apparatus UE.

Also, the base station eNB can transmit a resource release instruction (resource release) to the user apparatus UE1 for instructing the user apparatus UE1 to release a resource related to the resource release request (or for notifying that the base station eNB has released the resource) (step 207). The user apparatus UE1 that receives the resource release instruction (notification) releases the resource that is assigned.

By the way, to execute step 207 (resource release instruction transmission) is not essential, and it may not be performed. In such a case, for example, the user apparatus UE1 may release the resource being triggered by transmission of the resource release request, or may release the resource being triggered by a reception of an ACK signal and the like of low layer for the resource release request.

As a trigger based on which the user apparatus UE1 transmits a resource release request, there are, for example, elapse of a predetermined time after the last SA or data is transmitted, elapse of a predetermined time after a resource is assigned in step 204, an instruction from an upper layer of the user apparatus UE1, and the like. However, it is not limited to these.

Detailed Example of Resource Release Request

In the before-mentioned resource release request in Discovery/Communication, information indicating a resource of a release target may be included in the resource release request. The information indicating a resource is, for example, a resource ID, information of a position of time-frequency, and the like. In a case where a number is assigned for each resource block in time-frequency space for D2D, the resource ID is, for example, the number.

Figure 4:
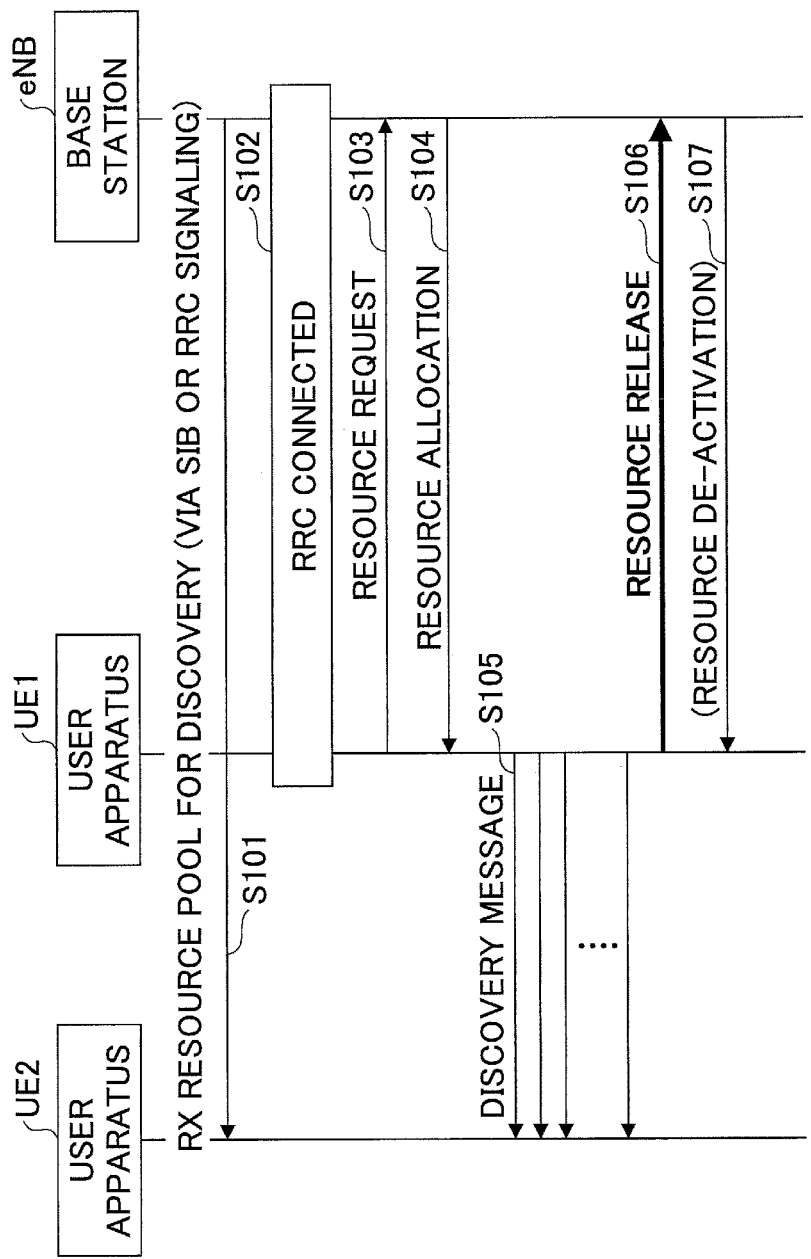
FIG. 4 is a sequence diagram for explaining process content in a first embodiment (in the case of Discovery)
Figure 5:
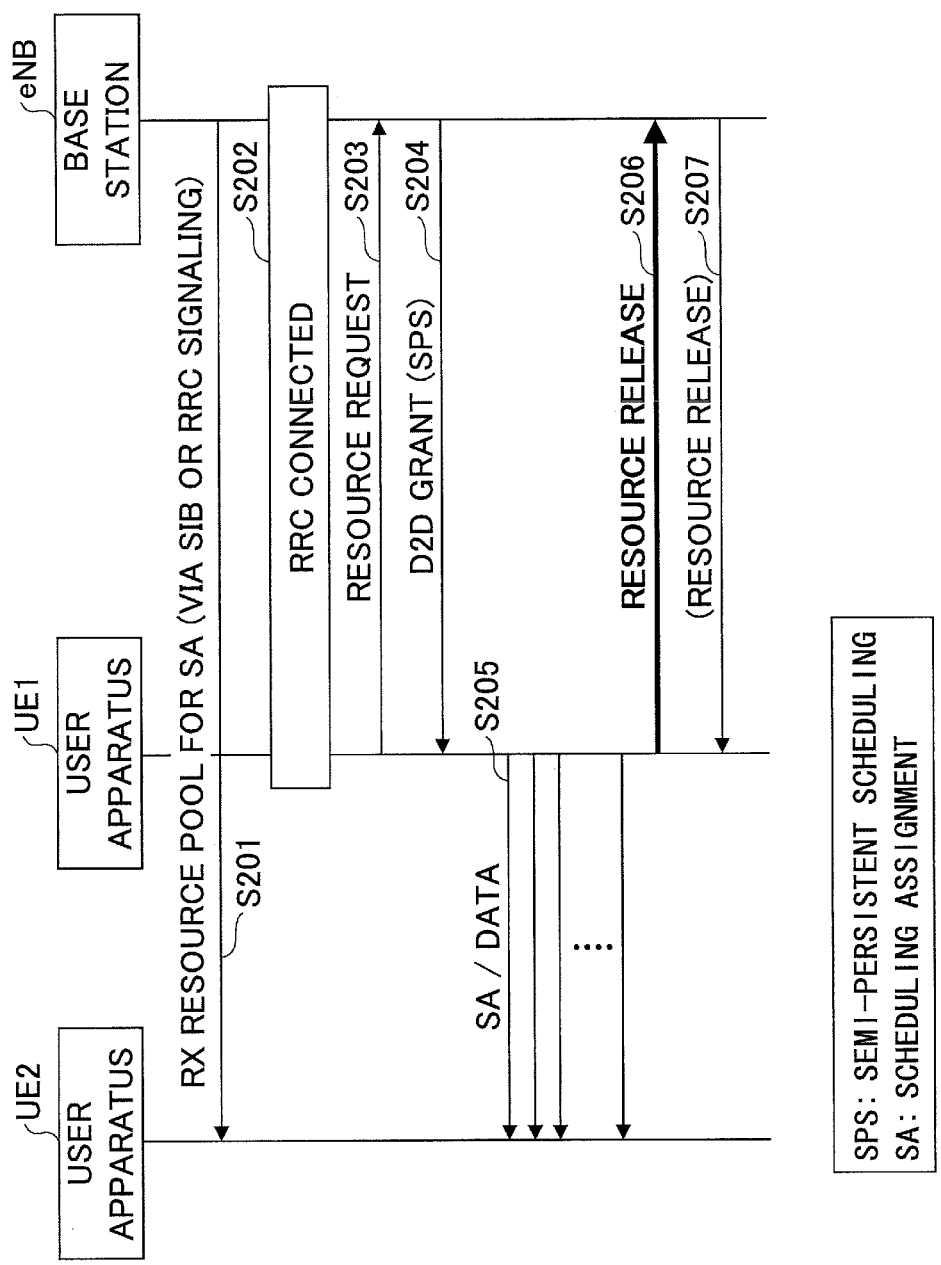
FIG. 5 is a sequence diagram for explaining process content in the first embodiment (in the case of Communication)

In this case, for example, as shown in FIG. 6A, in a resource request (a request for assigning a resource) shown in step 103 of FIG. 4/step 203 of FIG. 5, the user apparatus UE performs resource assignment request designating a resource 1 (1), so that the resource 1 is assigned (2). Next, the user apparatus UE transmits a resource release request designating the resource 1 in step 106 of FIG. 4/step 206 of FIG. 5 (3), so that the resource 1 is released.

Also, a common signaling (the same signal) may be used for a request for new assignment and a release request. This example is described with reference to FIG. 6B. In this example, "resource request" indicates a signal common to assignment and release.

As shown in FIG. 6B, the user apparatus UE performs "resource request" designating a resource 1 in step 103 of FIG. 4/step 203 of FIG. 5 (1), so that the resource 1 is assigned (2). Next, the user apparatus UE transmits "resource request" designating the resource 1 in step 106 of FIG. 4/step 206 of FIG. 5 (3), so that the resource 1 is released. That is, in this example, when the base station eNB receives "resource request" for a resource that has been assigned to the user apparatus UE, the base station eNB interprets it as a release request of the resource.

Also, a common format may be used for a resource assignment request and a resource release request, in which assignment or release can be identified by a flag bit.

Also, other than the resource release request for a specific resource as described above, for example, a resource release request may be used as a signaling for releasing the whole resource of a specific Type of Discovery or a specific Mode of Communication. Or, a resource release request may be used as a signaling for notifying of end of use of D2D communication of Discovery or Communication. For utilizing the resource release request as these types of signaling, for example, information for identifying which type of signaling the request means is included in the resource release request.

On Timing of Resource Release

In D2D communication, it is assumed that a resource for D2D communication periodically arrives, and it is called a Discovery period for Discovery. Including the case of Communication, such a period is called a D2D period.

As to release of a resource based on transmission of a resource release request from the user apparatus UE, or as to release of a resource based on notification (de-activation) and the like for a resource release request, it can be applied in units of D2D period.

For example, even when a resource release request is transmitted in the middle of a Discovery period, resource release is not performed within the period, so that transmission of Discovery messages continues, and the resource may be released from a next Discovery period. Also, the resource may be released after predetermined number of times of periods from the period when the resource release request is transmitted. Same applies to SA/data transmission of Communication.

Accordingly, the reception side user apparatus UE of D2D can perform reception by assuming that transmission of the signal is not stopped within the Discovery period, for example, so that it becomes possible to perform combining reception when a Discovery message is transmitted repeatedly within a period. Same applied to the case of Communication.

This is described with reference to FIG. 7. FIG. 7 shows an example of a transmission period of D2D (example: Discovery) of the user apparatus UE. As shown in FIG. 7, a transmission period (shaded area) arrives every D2D period. A D2D signal is transmitted by an assigned resource in the transmission period. This example indicates that, in a case where a resource release request is transmitted within a D2D period, the resource is not released within that period, but the resource is released in a next period, for example.

Modified Example of First Embodiment

As described so far, in the first embodiment, a semistatic resource is released by transmitting a resource release request to the base station eNB. The resource release request may be an explicit signaling signal as described so far. Alternatively, resource release operation may be performed by regarding information transmitted by D2D communication as a resource release request. In the present modified example, an example is described in which resource release is performed by regarding information transmitted in D2D communication as a resource release request.

A sequence example of processes of this modified example in the case of Discovery of D2D is described with reference to FIG. 8.

Figure 8:
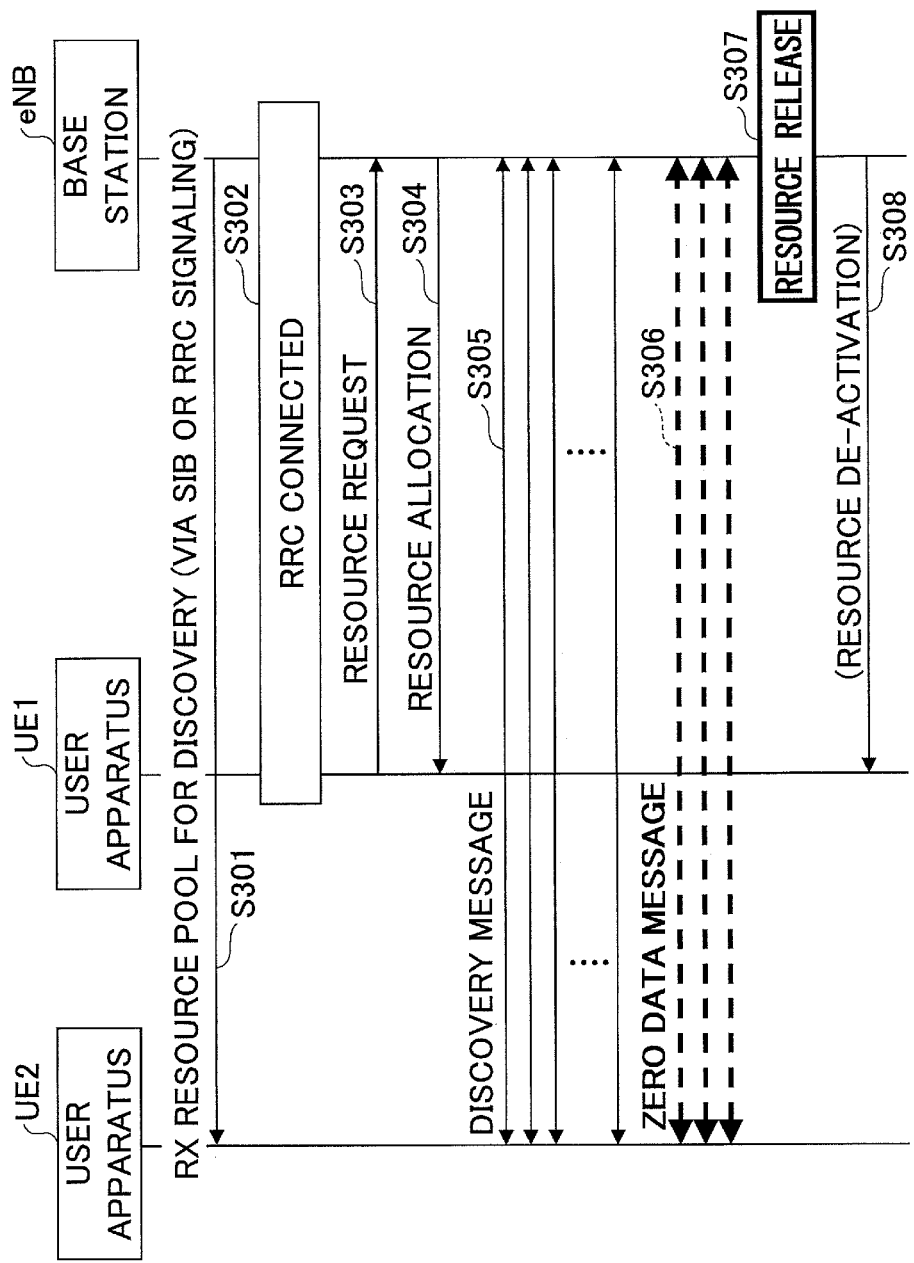
FIG. 8 is a sequence diagram for explaining process content of a modified example in the first embodiment (in the case of Discovery)

Steps 301~304 of FIG. 8 are the same as steps 101~104 of FIG. 4. In step 305 of FIG. 8, the user apparatus UE1 transmits a Discovery message using an assigned resource. In the present modified example, it is assumed that the user apparatus UE2 receives the Discovery message, and also, the base station eNB can receive the Discovery message.

In step 306, the user apparatus UE1 determines to release an assigned resource, and transmits a Discovery message in which specific information is set as content of the Discovery message, for example. More specifically, for example, the user apparatus UE1 transmits a Discovery message in which a special bit sequence (bit sequence in which zeros are filled) is set to a MAC SDU or MAC PDU.

This Discovery message corresponds to a resource release request, so that the base station eNB that receives the Discovery message releases the resource assigned for Discovery to the user apparatus UE1 (step 307). Accordingly, it becomes possible that the base station eNB can assign the resource to another user apparatus UE.

After that, the base station eNB can transmit, to the user apparatus UE1, a resource de-activation for instructing release of a resource related to the resource release request (or, for notifying that the resource has been released) (step 308). In the same way as the case of FIG. 4, step 308 may not be performed.

As a trigger for the user apparatus UE1 to transmit a Discovery message corresponding to a resource release request, there are, for example, elapse of a predetermined time after transmitting the last Discovery message (one including information of Discovery), elapse of a predetermined time after a resource is assigned in step 304, and an instruction from an upper layer of the user apparatus UE1 (for example, content of a specific Discovery message) and the like. But, it is not limited to these.

A sequence example of processes of this modified example in the case of Communication of D2D is described with reference to FIG. 9.

Figure 9:
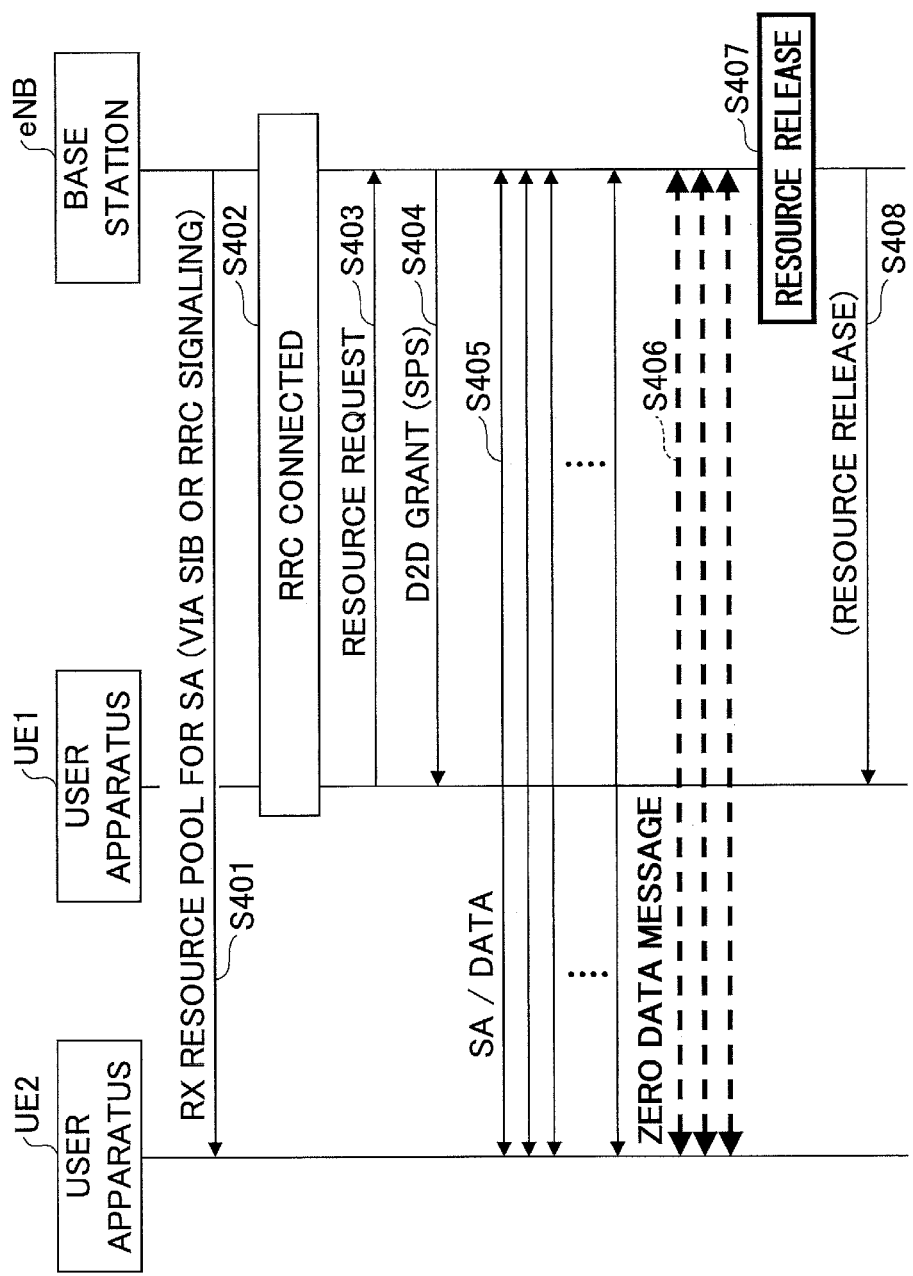
FIG. 9 is a sequence diagram for explaining process content of a modified example in the first embodiment (in the case of Communication)

Steps 401~404 of FIG. 9 are the same as steps 201~204 of FIG. 5. In step 405 of FIG. 9, the user apparatus UE1 transmits SA/data using an assigned resource. In the present modified example, it is assumed that the user apparatus UE2 receives the SA/data, and also, the base station eNB can receive the SA/data.

In step 406, the use apparatus UE1 determines to release an assigned resource, and transmits an SA or data in which specific information is set as content of the SA or data, for example. More specifically, for example, the user apparatus UE1 transmits an SA or data in which a special bit sequence (bit sequence in which zeros are filled, and the like) is set to a MAC SDU or MAC PDU.

This SA/data corresponds to a resource release request, so that the base station eNB that receives the SA/data releases the resource assigned for SA/data to the user apparatus UE1 (step 407). Accordingly, it becomes possible that the base station eNB can assign the resource to another user apparatus UE.

After that, the base station eNB can transmit, to the user apparatus UE1, a resource release instruction (resource release) for instructing release of a resource related to the resource release request (or, for notifying that the resource has been released) (step 408). In the same way as the case of FIG. 5, step 408 may not be performed.

As a trigger for the user apparatus UE1 to transmit SA/data corresponding to a resource release request, there are, for example, elapse of a predetermined time after transmitting the SA/data (one including significant information as SA/data), elapse of a predetermined time after a resource is assigned in step 404 and the like. But, it is not limited to these.

Detailed Example of Modified Example

In the following, the Discovery message and SA/data used as the resource release request in the modified example are collectively referred to as a D2D signal for resource release.

As described before, the D2D signal for resource release for notification of resource release may be a message in which zeros are filled, or a special bit sequence other than zero filing may be used. Also, it is possible to implicitly notify of a resource release by no transmission.

The base station eNB may release a resource for D2D assigned to the user apparatus UE (user apparats UE of a transmission source of the D2D signal for resource release) when receiving the D2D signal for resource release at least once, or the base station eNB may release the resource when receiving the D2D signal for resource release continuously N times (N is an integer equal to or greater than 2).

Also, the base station eNB may notify, by upper layer signaling (including RRC signaling), the user apparatus UE of the number of times of reception of the D2D signal for resource release by which the base station eNB releases the resource. As mentioned above, by notifying of the number of times, for example, when the user apparatus UE desires to perform resource release, the user apparatus UE can ascertain that it is only necessary to transmit the D2D signal for resource release a number of times equal to or greater than the notified number of times.

Also, the user apparatus UE may perform release of its own resource by transmitting the D2D signal for resource release a predetermined number of times, or the user apparatus UE may perform resource release at the time point when receiving a release instruction (or release notification) without performing the resource release until receiving the release instruction (or release notification) from the base station eNB.

In the case where the user apparatus UE performs resource release based on transmitting of the D2D signal for resource release a predetermine number of times, the predetermined number of times may be the same as or larger than the number of times of the continuous reception based on which the base station eNB determines to perform resource release. The user apparatus UE may calculate the larger value by adding a predetermined value to the number of times (the number of times of the continuous reception based on which the base station eNB determines to perform resource release) received from the base station eNB by upper layer signaling, or the user apparatus UE may receive the larger value itself from the base station eNB by upper layer signaling.

Assuming that the base station eNB does not notify the user apparatus UE that the resource has been released (assuming that step 408 of FIG. 9 is not performed), the user apparatus UE cannot know whether reception of the D2D signal for resource release succeeds or not at the base station eNB (whether resource is released in the base station eNB). Therefore, by using a value larger than the number of continuous reception times as the number of times of transmission of the D2D signal for resource release for releasing the resource of the user apparatus UE, the user apparatus UE can transmit the D2D signal for resource release by allowing a margin. Thus, it becomes possible to increase possibility in that state mismatch between the base station eNB and the user apparatus UE can be avoided.

It is not always true that the base station eNB can receive a D2D signal from the user apparatus UE. Thus, for example, when the base station eNB confirms that it can receive a D2D signal from the user apparatus UE, or when the base station eNB is provided with a function of receiving a D2D signal, the base station eNB may configure the availability of the D2D signal for resource release to the user apparatus UE by upper layer signaling (including RRC signaling). When the configuration is made in the user apparatus UE, the user apparatus UE can use the D2D signal for resource release.

Second Embodiment

Next, a second embodiment is described. In the second embodiment, a valid term is set for an assigned resource, so that the resource is released when the valid term elapses. More specifically, for example, a timer in which the valid term is set is started when the resource is assigned, and the resource is released when the valid term expires.

The valid term (timer value) of the resource may be notified from the base station eNB to the user apparatus UE by including it in a resource assignment signal (Resource allocation, D2D grant and the like), and also the valid term may be notified by upper layer signaling (including RRC or MAC) or by (E)PDCCH separately from the resource assignment signal. Also, the valid term (timer value) of the resource may be determined as a fixed value, so that notification of the valid term (timer value) may not be performed.

The base station eNB holds a valid term (timer value) the same as the valid term (timer value) set in the user apparatus UE, so that the resource is also released in the base station eNB in synchronization with resource release in the user apparatus UE. Therefore, it is not necessary that the base station eNB performs resource release notification to the user apparatus UE.

A sequence example of processes of the second embodiment in the case of Discovery of D2D is described with reference to FIG. 10.

Figure 10:
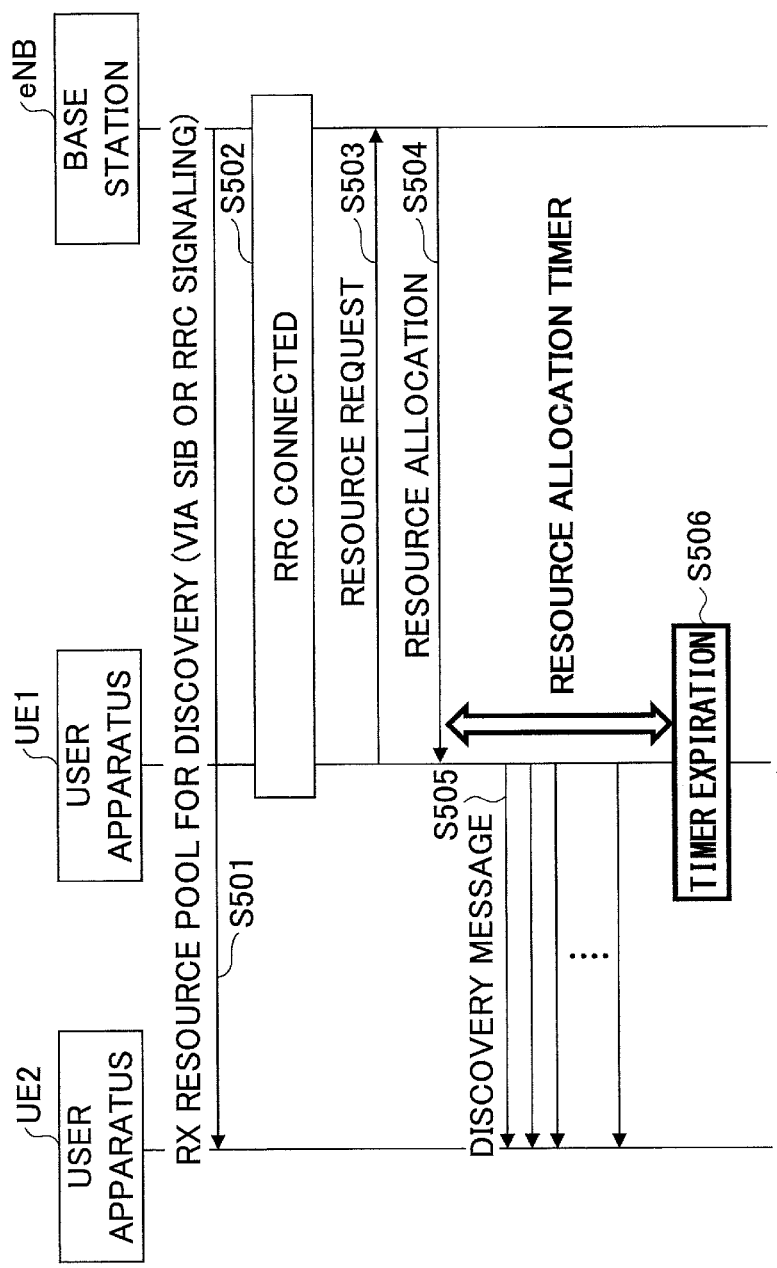
FIG. 10 is a sequence diagram for explaining process content in a second embodiment (in the case of Discovery)

Steps 501~503 of FIG. 10 are the same as steps 101~103 of FIG. 3. In step S504, a resource assignment (resource allocation) is transmitted from the base station eNB to the user apparatus UE. For example, in addition to information of a resource, a valid term (timer value) of the resource may be included in the signal of the resource assignment, for example.

The user apparatus UE1 that receives the resource assuagement from the base station eNB starts a timer in which the valid term is set. During a period until the timer expires, the user apparatus UE1 performs transmission of a Discovery message (step 505).

Then, when the timer expires (step 506), the user apparatus UE1 releases the resource for Discovery assigned in step 504. Also, at the same time, the base station eNB releases the resource for Discovery assigned to the user apparatus UE being triggered by expiration of the timer managed in the base station eNB.

Next, a sequence example of processes of the second embodiment in the case of Communication of D2D is described with reference to FIG. 11.

Figure 11:
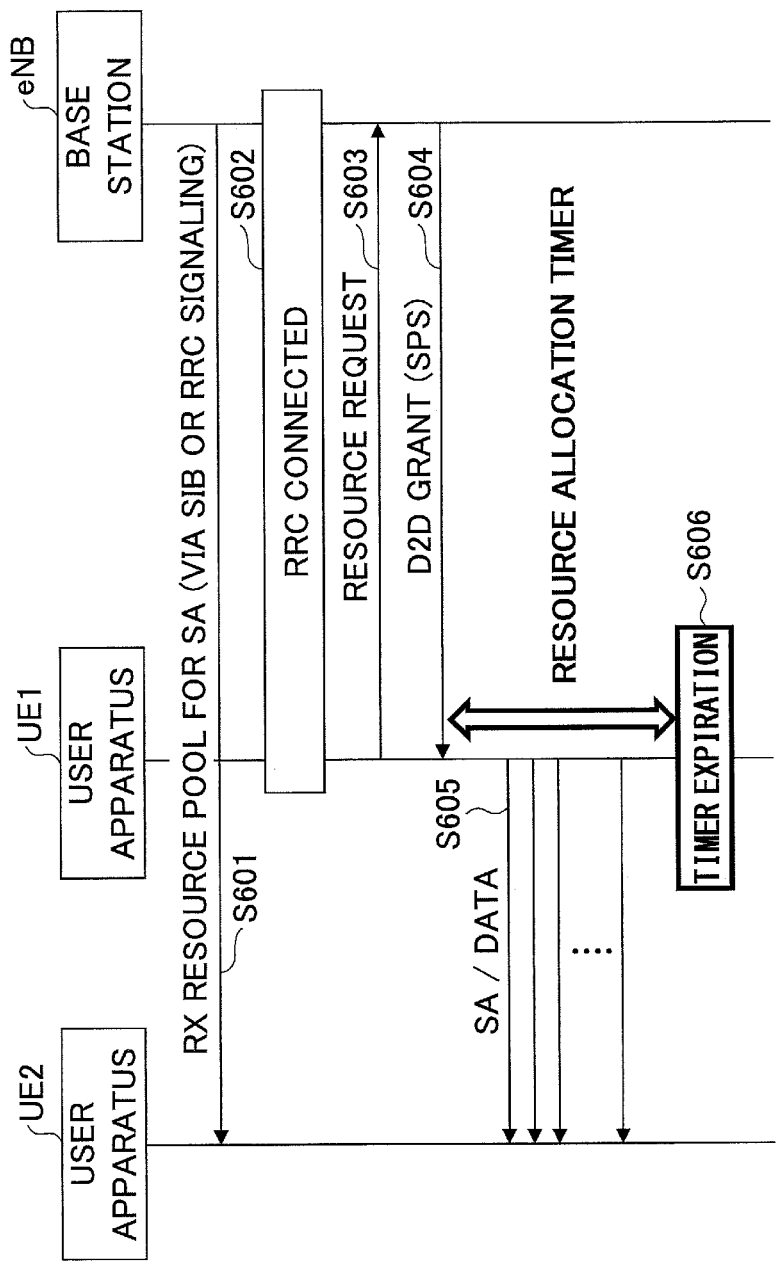
FIG. 11 is a sequence diagram for explaining process content in the second embodiment (in the case of Communication)

Steps 601~603 of FIG. 11 are the same as steps 201~203 of FIG. 5. In step S604, a resource assignment signal (D2D grant (SPS)) is transmitted from the base station eNB to the user apparatus UE. For example, in addition to information of a resource, a valid term (timer value) of the resource may be included in the signal of the resource assignment, for example.

The user apparatus UE1 that receives the resource assuagement from the base station eNB starts a timer in which the valid term is set. During a period until the timer expires, the user apparatus UE1 performs transmission of SA/data (step 605).

Then, when the timer expires (step 606), the user apparatus UE1 releases the resource for Communication assigned in step 604. Also, at the same time, the base station eNB releases the resource for Communication assigned to the user apparatus UE being triggered by expiration of the timer managed in the base station eNB.

Modified Example of the Second Embodiment

In the second embodiment, the user apparatus UE may notify the base station eNB of a requesting valid term (timer value) by transmitting a resource request to the base station eNB.

A sequence example of processes of the present modified example in the case of Discovery of D2D is described with reference to FIG. 12. Steps 701~704 of FIG. 12 are the same as steps 501~504 of FIG. 10.

In the example of FIG. 12, the user apparatus UE transmits a resource request to the base station eNB in step 706 before expiration of the timer that started based on resource assignment of step 704. Although details of functions of the resource request are described later, this resource request has a meaning for requesting update of the timer (reset, timer value setting, timer restart), for example. In step 707, the user apparatus UE receives a resource assignment signal. For example, the resource assignment signal includes a valid term (timer value) as well as resource information, so that the user apparatus UE1 that receives it starts (restarts) the timer in which the timer value is set. Accordingly, the timer value can be substantially increased, so that the user apparatus UE1 can continuously transmit the Discovery message until the timer expires (step 705).

A sequence example of processes of the present modified example in the case of Communication of D2D is described with reference to FIG. 13. Steps 801~804 of FIG. 13 are the same as steps 601~604 of FIG. 11.

In the example of FIG. 13, the user apparatus UE transmits a resource request to the base station eNB in step 806 before expiration of the timer that started based on resource assignment of step 804. This resource request has a meaning for requesting update of the timer (reset, timer value setting, timer restart), for example. In step 807, the user apparatus UE receives an resource assignment signal. For example, the resource assignment signal includes a valid term (timer value) as well as resource information, so that the user apparatus UE1 that receives it starts (restarts) the timer in which the timer value is set. Accordingly, the timer value can be substantially increased, so that the user apparatus UE1 can continuously transmit SA/data until the timer expires (step 805).

By adopting the process content as shown in FIGS. 12 and 13, the base station eNB can set a timer value for a resource request of one time to be a minimum timer value, and the user apparatus UE can continue transmission of a D2D signal by avoiding timer expiration by transmitting a resource request as necessary.

Detailed Example of the Resource Request in the Second Embodiment

Here, more detailed examples on the resource request are described. For example, as the resource request transmitted from the user apparatus UE to the base station eNB, a new (or additional) resource assignment request and a resource update request may be provided. The difference of these types may be identified by a predetermined bit value included in the signal of the resource request, for example.

FIG. 14A shows an example in which the resource request is a new (or an additional) resource assignment request. As shown in FIG. 14A, for example, a resource request designating a resource 1 is transmitted (1), so that the resource 1 is newly (or additionally) is assigned, and a timer starts with a timer value that is set in a resource assignment signal for the resource request (2).

FIG. 14B shows an example in which the resource request is a resource update request. In this example, it is assumed that the resource 1 has already been assigned. As shown in FIG. 14B, a resource request designating the resource 1 is transmitted (1), so that the timer restarts with a timer value that is set in a resource assignment signal for the resource request (2). Resource assignment remains the resource 1 without change. Or, the timer may be restarted by a previous timer value without including the timer value in the resource assignment signal.

By providing such an update request, double assignment can be avoided when performing resource request again during a period when a resource assignment is valid.

Also, a resource to be assigned to the user apparatus UE may be only one assignment (a resource assigned by assignment of one time), so that assignment so far may be cleared every time assignment occurs. This example is shown in FIG. 14C. In this example, it is assumed that the resource 1 is already assigned. In this state, when a resource request designating a resource 2 is transmitted (1), the resource 1 is released by a resource assignment signal for the resource request, the resource 2 is assigned, and the timer restarts with a timer value set for the resource 2 (2). According to this scheme, although additional assignment of a resource cannot be performed, it becomes possible to avoid the above-mentioned double assignment problem.

A resource ID or a time-frequency resource may be indicated in a resource request as described above, or it may not be indicated. In the case where it is not indicated, for example, the base station eNB selects a free resource and assigns it. As mentioned above, in the case where the resource ID or the time-frequency resource is indicated, the base station eNB that receives a resource request for a resource that has already been assigned can interpret the resource request as an updating request.

Instead of the resource request, a BSR (Buffer status report) for D2D may be notified from the user apparatus UE to the base station eNB. The BSR includes, for example, a data amount that the user apparatus UE transmits in D2D communication during a predetermined period (example: period of the timer value). Or, it may include a data amount transmitted by one time D2D transmission. The base station eNB that receives the BSR can determine the amount of a resource to assign based on the data amount.

By the way, as a trigger of a resource (update) request, a timer value of resource assignment may be used. For example, resource request may be performed when the timer expires, or when a counter value of the timer exceeds a threshold notified by upper layer signaling (including RRC signaling). By performing resource request at a predetermined timing, the base station eNB can assign an uplink data resource for the resource request without a request from the user apparatus UE.

In the second embodiment including the modified example, expiration of a predetermined period (timer value) is taken as an example of a trigger of resource release. Instead of the predetermined period, the number of times of transmission of a D2D signal (Discovery message for Discovery, SA/data for Communication) transmitted from the user apparatus UE1 to the user apparatus UE2 may be used as a trigger for the resource release. In this case, a number of times instead of a period (valid term) is used as the timer value set from the base station eNB, and a value counted by the timer is a number of times of transmission instead of a period. Accordingly, processes of resource release/update and the like can be performed in the same way as the case where the trigger is a period.

Also, in each of the first and the second embodiment, in a case where transmission of D2DSS (D2D synchronization signal) is instructed in association with Discovery or Communication, transmission of D2DSS that is transmitted in a Discovery resource pool to be released or a Communication resource pool to be released may be stopped at the same time of release of the resource. Also, in a case where TA (Timing Advance) is used for determining transmission timing of data for Discovery or Communication, the semistatic resource (Discovery or Communication) may be released when the TA timer expires even in an RRC_CONNECTED state, or, transmission timing of a D2D signal may be determined using a TA value that is received last if the user apparatus UE is in the RRC_CONNECTED state. Or, transmission may be performed using reception timing of downlink without applying TA (TA=0). Or, the user apparatus UE may be configured such that it cannot transmit a D2D signal until a TA value is obtained while the resource is kept assigned. In any of the above-mentioned cases, in the case of TDD, a fixed timing offset such as 624 samples may be added. Accordingly, uncertainty of transmission timing can be avoided.

Apparatus Configuration Example

In the following, configuration examples of the user apparatus UE and the base station eNB that perform operation of the embodiment (including first and second embodiments and each modified example) of the present invention are described.

Configuration Example of the User Apparatus UE

Figure 15:
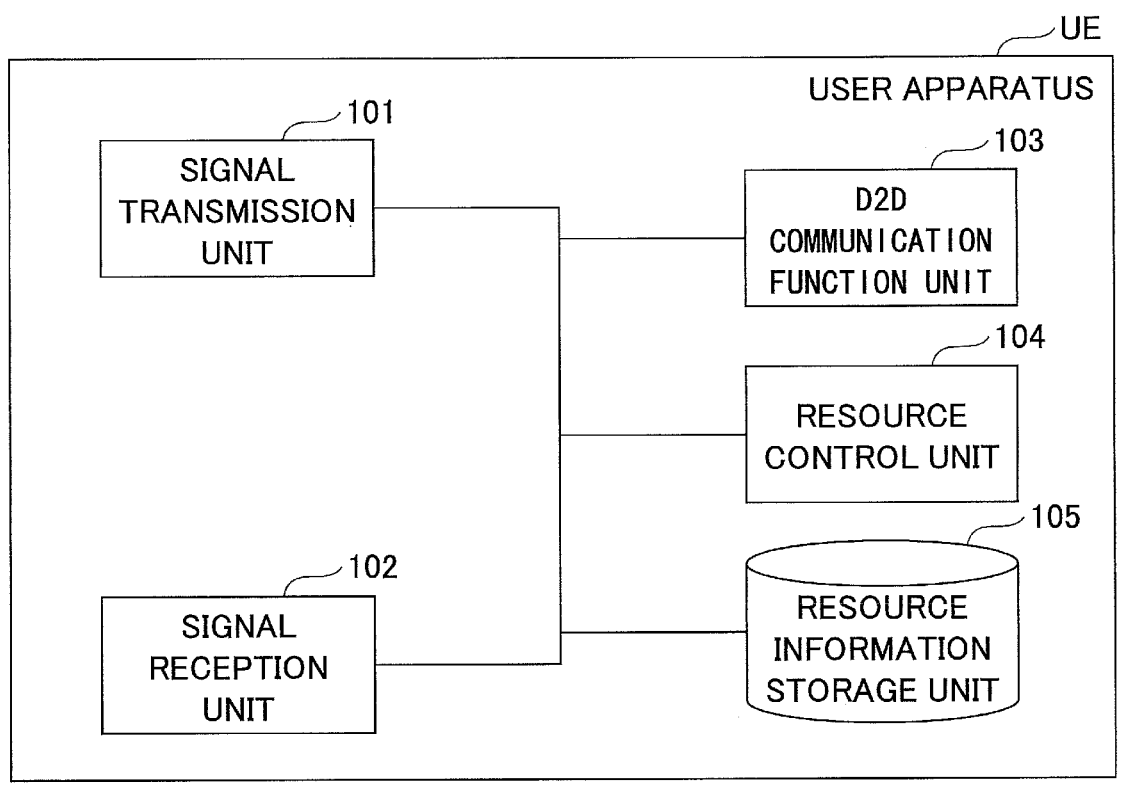
FIG. 15 is a block diagram of a user apparatus UE.

FIG. 15 shows a functional block diagram of the user apparatus UE of the present embodiment. As shown in FIG. 15, the user apparatus UE includes a signal transmission unit 101, a signal reception unit 102, a D2D communication function unit 103, a resource control unit 104, and a resource information storage unit 105. FIG. 15 only shows functional units especially related to the embodiment of the present invention in the user apparatus UE, and the user apparatus UE also includes at least functions, not shown in the figure, for performing operation complying with LTE. Also, the functional configuration shown in FIG. 15 is merely an example. Any function segmentations and any names of functional units can be used as long as the user apparatus UE can execute processing described in the present embodiment.

The signal transmission unit 101 includes a function configured to generate various signals of physical layer from a signal of an upper layer to be transmitted from the user apparatus UE, and to transmit the signals by radio. The signal transmission unit 101 includes a transmission function of D2D communication and a transmission function of cellular communication.

The signal reception unit 102 includes a function configured to receive various signals by radio from another user apparatus UE or the base station eNB, and to obtain a signal of upper layer from the received physical layer signals. The signal reception unit 102 includes a reception function of D2D communication and a reception function of cellular communication.

The D2D communication function unit 103 includes a function of a D2D application to perform Discovery signal transmission and reception control, and D2D data transmission and reception control and the like. The resource control unit 104 performs control of resource release request transmission, resource request transmission, resource assignment reception, resource assignment/release, timer management and the like. The resource information storage unit 105 stores information indicating a resource assigned by resource assignment. Also, when the resource is released, the information is deleted. The resource control unit 104 can ascertain status of resource assignment by referring to the resource information storage unit 105.

Configuration Example of the Base Station eNB

Figure 16:
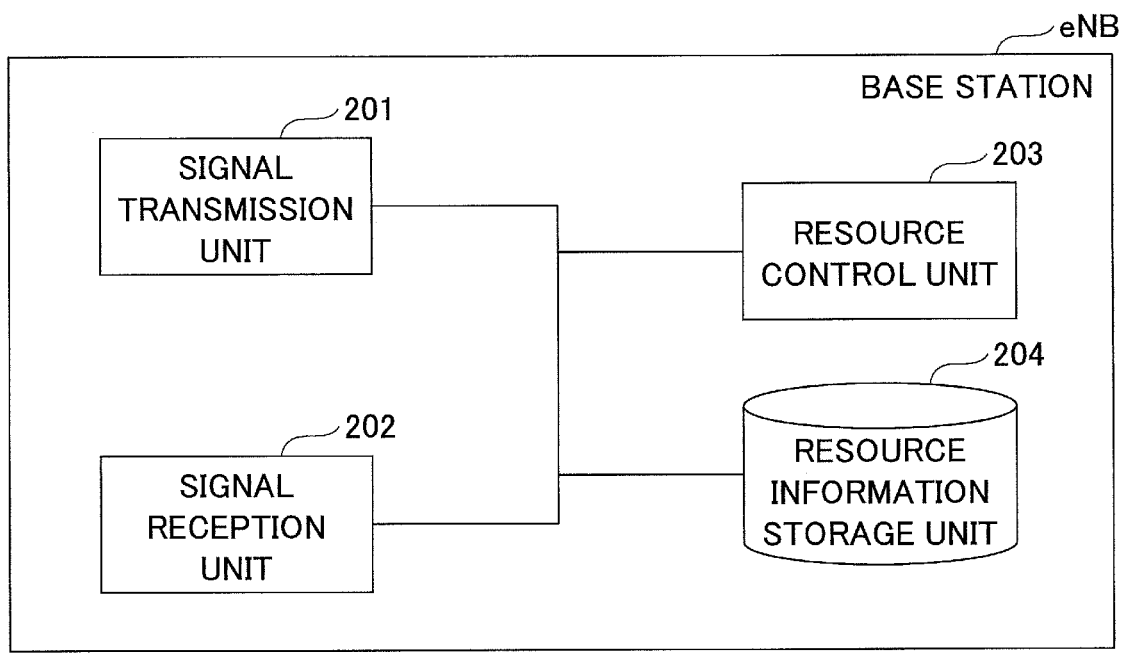
FIG. 16 is a block diagram of a base station eNB.

FIG. 16 shows a functional block diagram of the base station eNB of the present embodiment. As shown in FIG. 16, the base station eNB includes a signal transmission unit 201, a signal reception unit 202, a resource control unit 203, and a resource information storage unit 204. FIG. 16 only shows functional units especially related to the embodiment of the present invention in the base station eNB, and the base station eNB also includes at least functions, not shown in the figure, for performing operation as a base station in a mobile communication system complying with LTE. Also, the functional configuration shown in FIG. 16 is merely an example. Any function segmentations and any names of functional units can be used as long as the base station eNB can execute processing described in the present embodiment.

The signal transmission unit 201 includes a function configured to generate various signals of physical layer from a signal of an upper layer to be transmitted from the base station eNB, and to transmit the signals by radio. The signal reception unit 202 lincludes a function configured to receive various signals by radio from user apparatuses UE, and to obtain a signal of upper layer from the received physical layer signals.

The resource control unit 203 performs control of resource request reception, resource assignment transmission, resource assignment/release control, timer management and the like that have been described so far. The resource information storage unit 204 stores information indicating resources assigned for each UE. Also, when a resource is released, the assignment information is deleted. The resource control unit 203 can ascertain status of resource assignment for each UE by referring to the resource information storage unit 204.

As described above, according to the present embodiment, there is provided a user apparatus for use in a mobile communication system that supports D2D communication, including: D2D communication means that transmits a D2D signal to another user apparatus by using a resource for D2D communication assigned from a base station in the mobile communication system; and resource control means that transmits, to the base station, a resource release request signal for requesting release of a resource for D2D communication assigned from the base station. According to this configuration, it becomes possible to avoid that a resource for D2D communication assigned to the user apparatus is held even when it is unnecessary.

In the mobile communication system, it is defined that a period for communication of the D2D signal periodically arrives, and the resource control means may release the resource in the user apparatus in a period on or after a next period of a period during which the resource release request signal is transmitted. According to this configuration, it becomes possible to avoid that transmission of a D2D signal stops in the middles of a period, so that a reception side can perform reception by expecting that D2D signal reception does not interrupt within a period.

The resource control means may transmit, to the base station, a resource request signal designating a resource that has already been assigned as the resource release request signal for requesting release of the resource. According to this configuration, the format of the signal can be made simple.

A D2D signal can be used as the resource release request signal. According to this configuration, resource release request can be realized without newly defining a resource release request signal.

In a case where the base station releases a resource assigned to the user apparatus when the base station receives a D2D signal, as the resource release request signal, a predetermined number of times, the resource control means may release the resource in the user apparatus when the resource control means transmits the D2D signal as the resource release request signal a number of times that is greater than the predetermined number of times. According to this configuration, even when the base station eNB does not notify the user apparatus UE that the resource has been released, it becomes possible to increase possibility in that state mismatch between the base station eNB and the user apparatus UE can be avoided.

Also, according to an embodiment of the present invention, there is provided a user apparatus for use in a mobile communication system that supports D2D communication, including: D2D communication means that transmits a D2D signal to another user apparatus by using a resource for D2D communication assigned from a base station in the mobile communication system; and resource control means that releases the resource when a predetermines period elapses or a number of times of transmission of the D2D signal reaches a predetermined number of times after the resource is assigned. Also, according to this configuration, it becomes possible to avoid that a resource for D2D communication assigned to the user apparatus is held even when it is unnecessary.

The resource control means may transmit a resource request signal to the base station, and start count of the elapse of the period or starts count of the number of times of transmission of the D2D signal in response to reception of a resource assignment signal from the base station for the resource request signal. According to this configuration, for example, D2D communication can be continued by avoiding expiration of the predetermined period (the predetermined number of times) by transmitting a resource request signal before the predetermined period (the predetermined number of times) expires.

The resource assignment signal may include the predetermined period or the predetermined number of times. According to this configuration, for example, it becomes possible that the base station eNB efficiently sets a proper predetermined period (predetermined number of times).

The user apparatus UE described in the present embodiment may include a CPU and a memory and may be realized by executing a program by the CPU (processor), or may be realized by hardware such as hardware circuits including logics of processing described in the present embodiment, or may be configured by coexistence of a program and hardware.

The base station eNB described in the present embodiment may include a CPU and a memory and may be realized by executing a program by the CPU (processor), or may be realized by hardware such as hardware circuits including logics of processing described in the present embodiment, or may be configured by coexistence of a program and hardware.

In the above, embodiments of the present invention have been explained. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the base station eNB and the user apparatus UE have been explained by using functional block diagrams.

However, such an apparatus may be implemented in hardware, software, or a combination thereof. Each of the software that operates according to an embodiment of the present invention by a processor provided in the base station eNB and the software that operates according to an embodiment of the present invention by a processor provided in the user apparatus UE may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiments and is intended to include various variations, modifications, alterations, substitutions and so on without departing from the spirit of the present invention.

The present international patent application claims priority based on Japanese patent application No. 2014-161903, filed in the JPO on Aug. 7, 2014, and the entire contents of the Japanese patent application No. 2014-161903 are incorporated herein by reference.

DESCRIPTION OF REFERENCE SIGNS eNB base station
UE user apparatus
101 signal transmission unit
102 signal reception unit
103 D2D communication function unit
104 resource control unit
105 resource information storage unit
201 signal transmission unit
202 signal reception unit
203 resource control unit
204 resource information storage unit

The invention claimed is:

1. A user apparatus for use in a mobile communication system that supports Device-to-Device (D2D) communication, comprising:
a transmitter that transmits a resource request signal including a resource request to a base station in the mobile communication system to request a resource for D2D communication, the user apparatus being radio resource control (RRC) connected to the base station; and
a receiver that receives the resource for D2D communication assigned from the base station,
wherein the transmitter transmits a D2D signal to another user apparatus by using the resource for D2D communication assigned from the base station, and
wherein, after transmitting the resource request signal, the transmitter transmits, to the base station, a resource request signal, including the same resource request for the resource for D2D communication previously transmitted to the base station, indicating that the user apparatus does no longer require the resource for D2D communication.

2. The user apparatus as claimed in claim 1, wherein, in the mobile communication system, it is defined that a period for communication of the D2D signal periodically arrives, and
wherein a processor releases the resource in the user apparatus in a period on or after a next period of a period during which a resource release signal, including the resource request, is transmitted.

3. A resource control method performed by a base station and a user apparatus for use in a mobile communication system that supports Device-to-Device (D2D) communication, comprising:
transmitting, by the user apparatus, a resource request signal including a resource request to a base station in the mobile communication system to request a resource for D2D communication, the user apparatus being radio resource control (RRC) connected to the base station; and
assigning, by the base station, the resource for D2D communication to the user apparatus,
wherein the user apparatus transmits a D2D signal to another user apparatus by using the resource for D2D communication assigned from the base station, and
wherein, after transmitting the resource request signal, the user apparatus transmits, to the base station, a resource request signal, including the same resource request for the resource for D2D communication previously transmitted to the base station, indicating that the user apparatus does no longer require the resource for D2D communication.

\* \* \* \* \*